US008244056B2

(12) United States Patent
Zeng et al.

(10) Patent No.: US 8,244,056 B2
(45) Date of Patent: Aug. 14, 2012

(54) IMAGE CONTRAST ENHANCEMENT APPARATUS AND METHOD THEREOF

(75) Inventors: Yi-Chong Zeng, Keelung (TW); Jing-Fung Chen, Taipei County (TW)

(73) Assignee: Institute for Information Industry, Taipei (TW)

( * ) Notice: Subject to any disclaimer, the term of this patent is extended or adjusted under 35 U.S.C. 154(b) by 448 days.

(21) Appl. No.: 12/630,845

(22) Filed: Dec. 4, 2009

(65) Prior Publication Data

US 2011/0116713 A1 May 19, 2011

(30) Foreign Application Priority Data

Nov. 16, 2009 (TW) .............................. 98138845 A

(51) Int. Cl.
*G06K 9/40* (2006.01)
(52) U.S. Cl. ...................................................... 382/274
(58) Field of Classification Search .................. None
See application file for complete search history.

(56) References Cited

U.S. PATENT DOCUMENTS

| | | | | |
|---|---|---|---|---|
| 5,164,993 | A * | 11/1992 | Capozzi et al. | 382/132 |
| 5,630,037 | A * | 5/1997 | Schindler | 345/592 |
| 6,078,686 | A * | 6/2000 | Kim | 382/167 |
| 6,163,621 | A * | 12/2000 | Paik et al. | 382/169 |
| 6,370,279 | B1 * | 4/2002 | Paik | 382/268 |
| 6,650,772 | B1 * | 11/2003 | Inoue et al. | 382/162 |
| 7,102,697 | B2 | 9/2006 | Lei et al. | |
| 7,386,186 | B2 | 6/2008 | Ovsiannikov | |
| 7,453,524 | B2 | 11/2008 | Lee et al. | |
| 7,515,748 | B2 * | 4/2009 | Nystrom et al. | 382/168 |
| 7,573,533 | B2 | 8/2009 | Moldvai | |
| 7,596,275 | B1 * | 9/2009 | Richardson et al. | 382/224 |
| 7,782,338 | B1 * | 8/2010 | Zaklika et al. | 345/619 |
| 7,800,657 | B2 * | 9/2010 | Hu | 348/229.1 |
| 2003/0161549 | A1 | 8/2003 | Lei et al. | |
| 2005/0163371 | A1 | 7/2005 | Nystrom et al. | |

FOREIGN PATENT DOCUMENTS

| | | |
|---|---|---|
| CN | 101510305 | 8/2009 |
| CN | 101551863 | 10/2009 |
| EP | 0383269 | 8/1990 |
| TW | 490974 | 6/2002 |

OTHER PUBLICATIONS

"Combined Search and Examination Report of Great Britain Counterpart Application" issued on Apr. 9, 2010, p. 1-p. 5, in which the listed references were cited.

\* cited by examiner

*Primary Examiner* — Yuzhen Ge
(74) *Attorney, Agent, or Firm* — Jianq Chyun IP Office

(57) ABSTRACT

An image contrast enhancement apparatus and method thereof are provided. The image contrast enhancement apparatus includes an image analysis module, a histogram separation unit, and a histogram adjustment unit. The image analysis module statistically analyzes pixels of an original image to produce a plurality of histogram bins and combines the histogram bins into a sub-histogram. The histogram separation unit separates each sub-histogram in every separation level into two sub-histograms in the next separation level, increases or decreases a base width of each sub-histogram such that the respective group density of two sub-histograms corresponding to the same separation point are substantially identical. The histogram adjustment unit re-distributes histogram bins of each sub-histogram or merges a portion of histogram bins of each sub-histogram in every separation level.

20 Claims, 4 Drawing Sheets

IMAGE CONTRAST ENHANCEMENT APPARATUS AND METHOD THEREOF

CROSS-REFERENCE TO RELATED APPLICATION

This application claims the priority benefit of Taiwan application serial no. 98138845, filed on Nov. 16, 2009. The entirety of the above-mentioned patent application is hereby incorporated by reference herein and made a part of this specification.

BACKGROUND

1. Technical Field

The present disclosure generally relates to an image contrast enhancement apparatus and a method thereof, and more particularly to an image contrast enhancement apparatus and a method thereof using the adaptive histogram adjustment.

2. Related Art

Under the environment in which surrounding light is not stable, such as the night, evening, or fog environment, the local contrast of the captured image may be weak. There are several method provided to solve the problem in which the contrast of the image is weak. For example, the technology provided by U.S. Pat. No. 7,573,533 B2 designs a transformation curve of an entire image to solve the problem mentioned above for the brightness distribution (such as high, middle, and low brightness) of each pixel in the entire image. For example, the technology provided by U.S. Pat. No. 7,453,524 B2 shifts levels of the YUV signal of the entire image, statistically analyzes the YUV signal of the entire image, and enhances the gray-level colors of the YUV signal of the entire image to solve the problem mentioned above. However, the two technologies for enhancing the entire image mentioned above have the drawback in which they only take a comprehensive consideration and can not enhance the local contrast.

Furthermore, for example, the technology provided by U.S. Pat. No. 7,386,186 B2 utilizes the edges of the image, and thus performs a non-liner transformation of the edges, such that the image is enhanced, and the problem mentioned above is solved. For example, the technology provided by U.S. Pat. No. 7,102,697 B2 remains the pixels having the high frequencies to solve the problem mentioned above by performing a statistical calculation on the spectrum distribution of the image. However, the two methods mentioned above have the drawback in which portions of the texture of the image may disappear.

Moreover, for example, the technology provided by TW Application 049097B adjusts the electrical signals before the image is completely captured, such that the image is enhanced and the problem mentioned above is solved. However, the method merely considers the light absorbing characteristic of each pixel in the image capturing apparatus, but ignores the whole content of the image.

The other technologies modified from the methods mentioned above are also provided. For example, the rubber band function known by people skilled in the art is used to adjust the histogram bins and to change the levels of the image. For example, the histogram equalization method can improve the contrasts of the images in the different applications. Furthermore, for example, the adaptive histogram equalization method and the gray-level grouping method based on the non-liner histogram can be used to automatically enhance contrast of the image. However, the methods mentioned above may have the problem of the block effect when the image is displayed.

SUMMARY

Accordingly, exemplary embodiments of the present disclosure provide an image contrast enhancement apparatus and a method thereof, which are based on the concept of the adaptive histogram adjustment. The image contrast enhancement apparatus and the method thereof adapt the technologies for separating the histogram bins, adjusting the histogram bins, enhancing the local contrast, and analyzing the image to flexibly utilize the large and small blocks, such that the features and contrast of the local image is automatically enhanced without having the problem of the block effect.

According to an exemplary embodiment of the present disclosure, an image contrast enhancement apparatus is provided. The image contrast enhancement apparatus is used to process an original image; and comprises an image analysis module and a local contrast enhancement module. The image analysis module statistically analyzes pixels of each of M computation windows to produce a plurality of histogram bins, and combines the histogram bins corresponding to each computation window into a sub-histogram, wherein M is a positive integer, sizes of the computation windows are not identical, and each of the histogram bins represents a total pixel number corresponding to a pixel value. The local contrast enhancement module enhances at least a local contrast for each of the computation windows, and generates M enhanced images, wherein the local contrast enhancement module comprises a histogram separation unit, a histogram adjustment unit, and a local contrast enhancement unit. The histogram separation unit sequentially separates the histogram bins in each of the computation windows into L separation levels according to a tree structure, separates the sub-histogram of in each separation level into the two sub-histograms in the next separation level, and increases or decreases a base width of each sub-histogram, such that group densities of the two sub-histograms are identical, wherein L is a positive number and a separation level number. The histogram adjustment unit re-distributes the histogram bins in each sub-histogram, or merges a portion of histogram bins in each sub-histogram. The local contrast enhancement unit enhances the at least one local contrast of the original image according to the computation windows, and generates enhanced images.

According to an exemplary embodiment of the present disclosure, the image contrast enhancement apparatus further comprises a color space transformation module, a window determination module, a level division determination module, an inversed color space transformation module, and a contrast synthesis module. The color space transformation module performs a color space transformation on a plurality of nature color values of pixels of the original image, such that pixel values of the pixels are mapping to optimized pixel values. The window determination module determines a total window number of the computation windows according to an original image size of the original image. The level division determination module determines the separation level number according to a total base number of the histogram bins of the sub-histograms of the computation window. The contrast synthesis module synthesizes the enhanced images into a synthesized image. The inversed color space transformation module converts the synthesized image into an output image.

According to an exemplary embodiment of the present disclosure, the histogram separation unit separates each sub-histogram in each separation level into the two sub-histograms in the next separation level, and the two sub-histograms correspond to a same separating point. The separating point is determined by calculating an equation (1), and the equation (1) is expressed as, $$\tau = \underset{0 \le t < s}{\operatorname{argmin}} \left| Y - \frac{1}{m} \sum_{i=0}^{t} H(i) \right|, \quad \text{equation (1)}$$

wherein τ is the separating point, s is a dimension of the histogram bins, t is the index of the histogram bin, and argmin (j) is a function for selecting the index corresponding to the minimum of the variable j, and Y is the configuration parameter of the separating point, Y is a real number greater than 0 and less than 1, m is a total pixel number of the pixels in each computation window, and H(k) is a total pixel number of the $k^{th}$ histogram bin.

According to an exemplary embodiment of the present disclosure, the histogram separation unit increases or decreases the respective base widths of the two sub-histograms corresponding to the same separating point in each separation level according to equations (2) and (3), such that the group densities of the two sub-histograms are the same, wherein the density ratio of the group density is determined in response to the Y value of the equation (1), and the equations (2) and (3) are expressed as, $$t_0 + t_1 = s \quad \text{equation (2)}$$

$$\frac{m_0}{t_0} = \frac{m_1}{t_1}, \quad \text{equation (3)}$$

wherein $t_0$ is the base width of the sub-histogram, $t_1$ is the other base width of the other sub-histogram corresponding to the same separating point, $m_0$ is a total pixel number of the sub-histogram, $m_1$ is a total pixel number of the other sub-histogram, and the fractional number $m_q/t_q$ is the group density of the $q^{th}$ sub-histogram.

According to an exemplary embodiment of the present disclosure, the histogram separation unit and the histogram adjustment unit recursively perform the following actions. The histogram separation unit separates each sub-histogram in each computation window to two sub-histograms in the next separation level, and increases or decreases the decreases the base width of the sub-histogram and the other base width of the other sub-histogram corresponding to the same separating point, such that two sub-histograms substantially have the same group density; and for the two sub-histograms having the same group density and corresponding to the same separating point, the histogram adjustment unit re-distributes the histogram bins of one of the two sub-histograms, or merges a portion of the histogram bins of the other one of the two sub-histograms, such that the two sub-histograms corresponding to the same separating point substantially have the same group density.

According to an exemplary embodiment of the present disclosure, after the histogram adjustment unit increases or decreases the base width of the sub-histogram and the other width of the other sub-histogram corresponding to the same separating point in the separation level, if the total number of the histogram bins having the non-zero pixel values in the sub-histogram is less than the dimension of the sub-histogram, the histogram adjustment unit increases the base width of the sub-histogram and re-distributes the base width. On the contrary, after the histogram adjustment unit increases or decreases the base width of the sub-histogram and the other width of the other sub-histogram corresponding to the same separating point in the separation level, if the total number of the histogram bins having the non-zero pixel values in the sub-histogram is greater than the dimension of the sub-histogram, the histogram adjustment unit merges a portion of the histogram bins of the sub-histogram such that the base width of the sub-histogram is decreased.

According to an exemplary embodiment of the present disclosure, an image contrast enhancing method is provided to process an original image. The image contrast enhancing method comprises steps of: (1) statistically analyzing pixels of each of M computation windows to produce a plurality of histogram bins, and combining the histogram bins corresponding to each computation window into a sub-histogram, wherein M is a positive integer, sizes of the computation windows are not identical, and each of the histogram bins represents a total pixel number corresponding to a pixel value; (2) sequentially separating the histogram bins in each of the computation windows into L separation levels according to a tree structure, wherein L is a positive number and a separation level number; (3) increasing or decreasing a base width of each sub-histogram, such that group densities of the two sub-histograms are identical, wherein L is a positive number and a separation level number; (4) re-distributing the histogram bins in each sub-histogram, and merging a portion of histogram bins in each sub-histogram; and (5) enhancing at least one local contrast of the original image according to the computation windows, and generating enhanced images.

According to an exemplary embodiment of the present disclosure, the image contrast enhancing method further comprises steps of: (6) performing a color space transformation on a plurality of nature color values of pixels of the original image, such that pixel values of the pixels are mapping to optimized pixel values; (7) determining a total window number of the computation windows according to an original image size of the original image; (8) determining the separation level number according to a total base number of the histogram bins of the sub-histograms of the computation window; (9) synthesizing the enhanced images into a synthesized image; and (10) converting the synthesized image into an output image.

Accordingly, the exemplary embodiments of the present disclosure provide an image contrast enhancement apparatus and a method thereof. The image contrast enhancement apparatus and the method thereof are based on the concept of the adaptive histogram adjustment, and recursively execute the histogram separating method and the histogram adjusting method. Furthermore, the image contrast enhancement apparatus and the method thereof enhance the local contrast of the image and analyze the image to flexibly utilize the large and small blocks, such that the features and contrasts of local images are automatically enhanced. In addition, the contrasts of the image are commonly enhanced by using the pixels of the neighboring area, and the drawback that the levels of the entire image are consistently enhanced is avoided. At the same time, the block effect is prevented, such that the texture area in the image is reserved, and the image is made smooth.

It is to be understood that both the foregoing general description and the following detailed description are exemplary, and are further intended to provide the explanation of the present disclosure as claimed.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and serve to explain the principles of the present disclosure together with the description.

DESCRIPTION OF THE EXEMPLARY EMBODIMENTS

Figure 1:
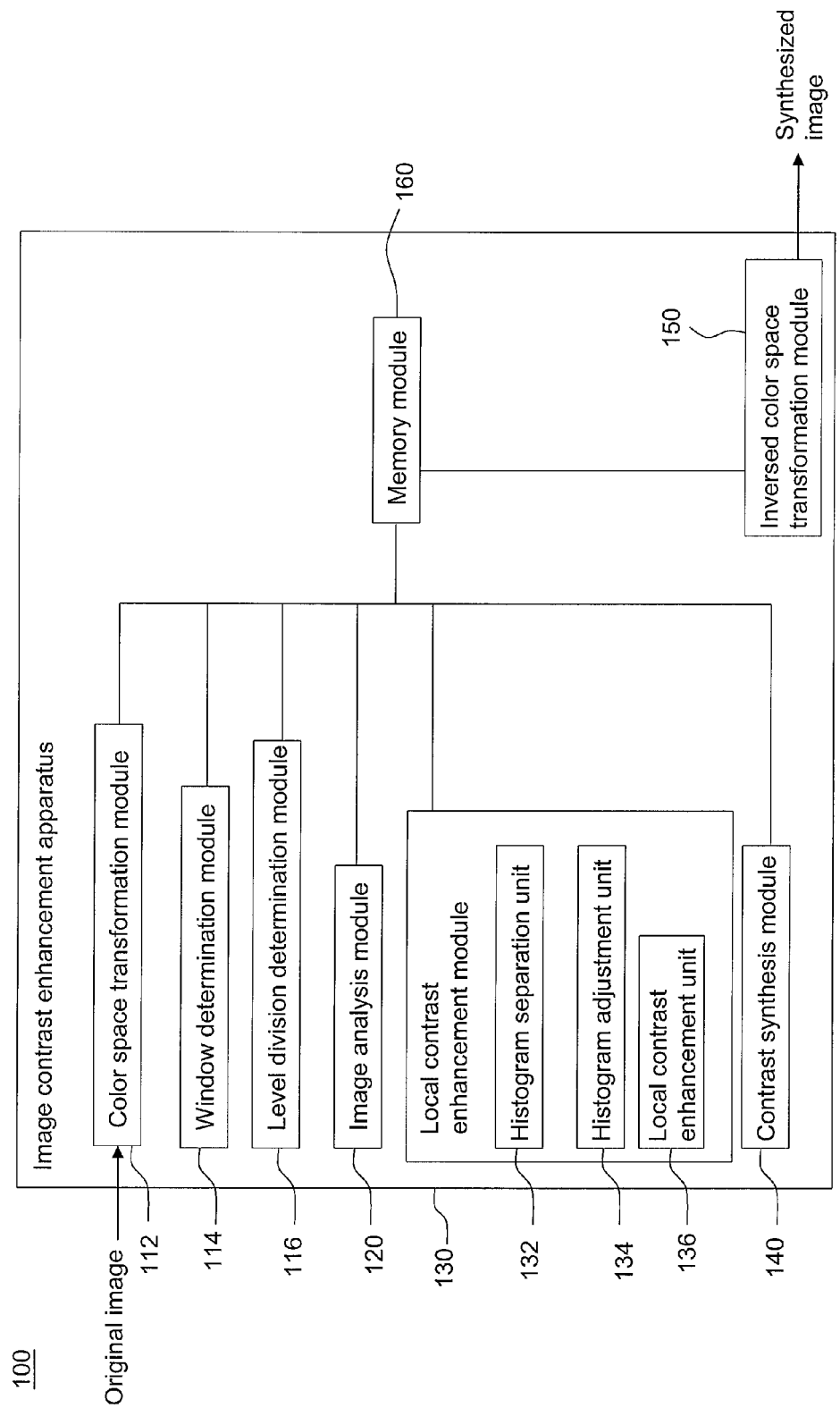
FIG. 1 is a system block diagram showing an image contrast enhancement apparatus provided by an exemplary embodiment of the present disclosure.

Reference will now be made in detail to the present exemplary embodiments of the present disclosure, examples of which are illustrated in the accompanying drawings. Wherever possible, the same reference numbers are used in the drawings and the description to refer to the same or like parts.

Figure 2A:
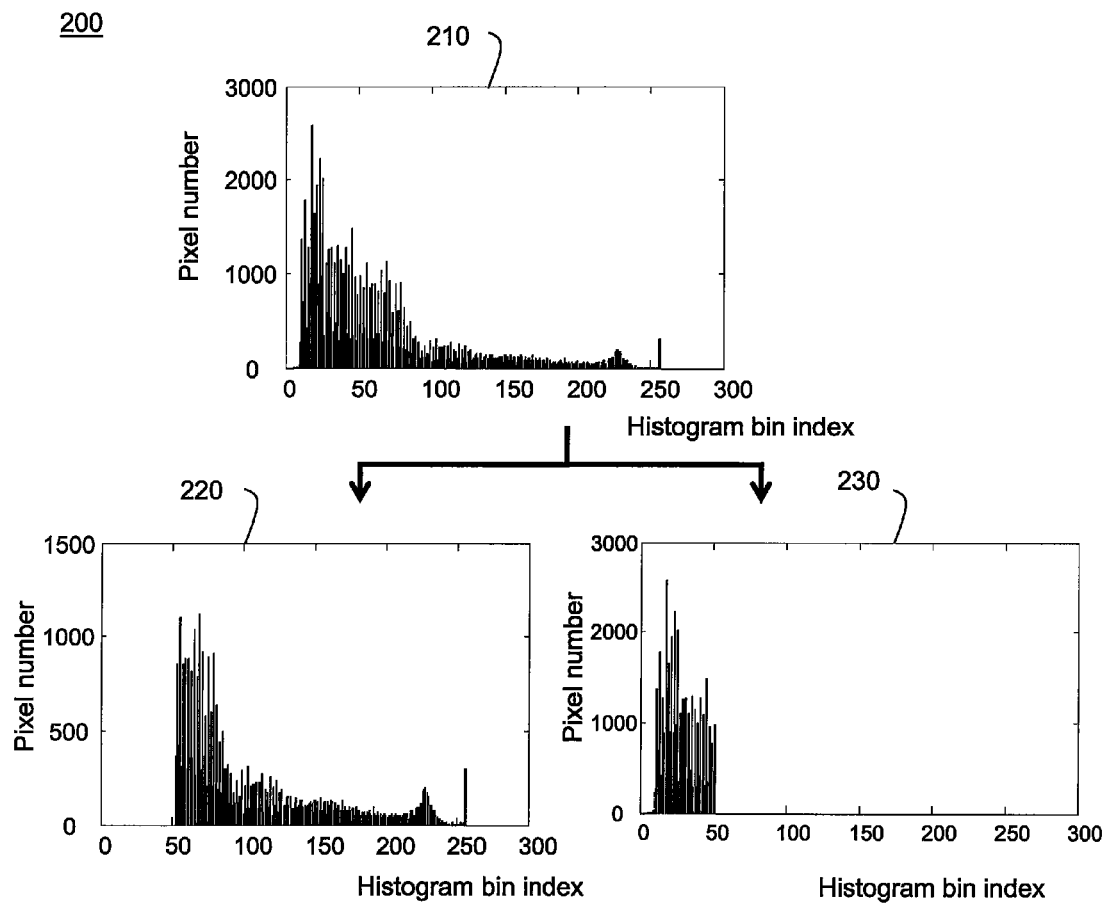
FIG. 2A is a schematic diagram demonstrating that the image contrast enhancement apparatus separates a sub-histogram.
Figure 3:
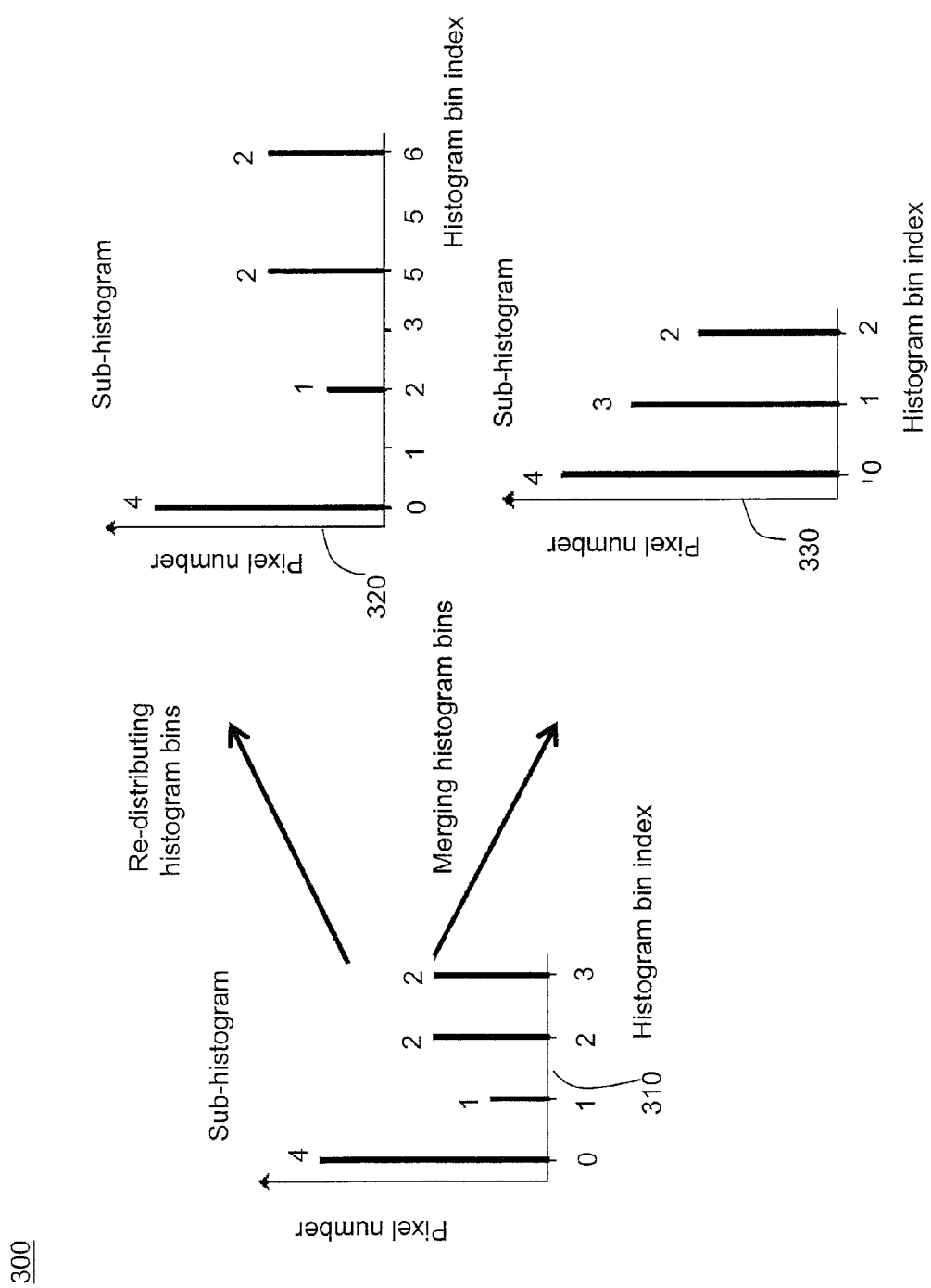
FIG. 3 is a schematic diagram demonstrating that the histogram bins are re-distributed and merged according to an exemplary embodiment of the present disclosure.
Figure 4:
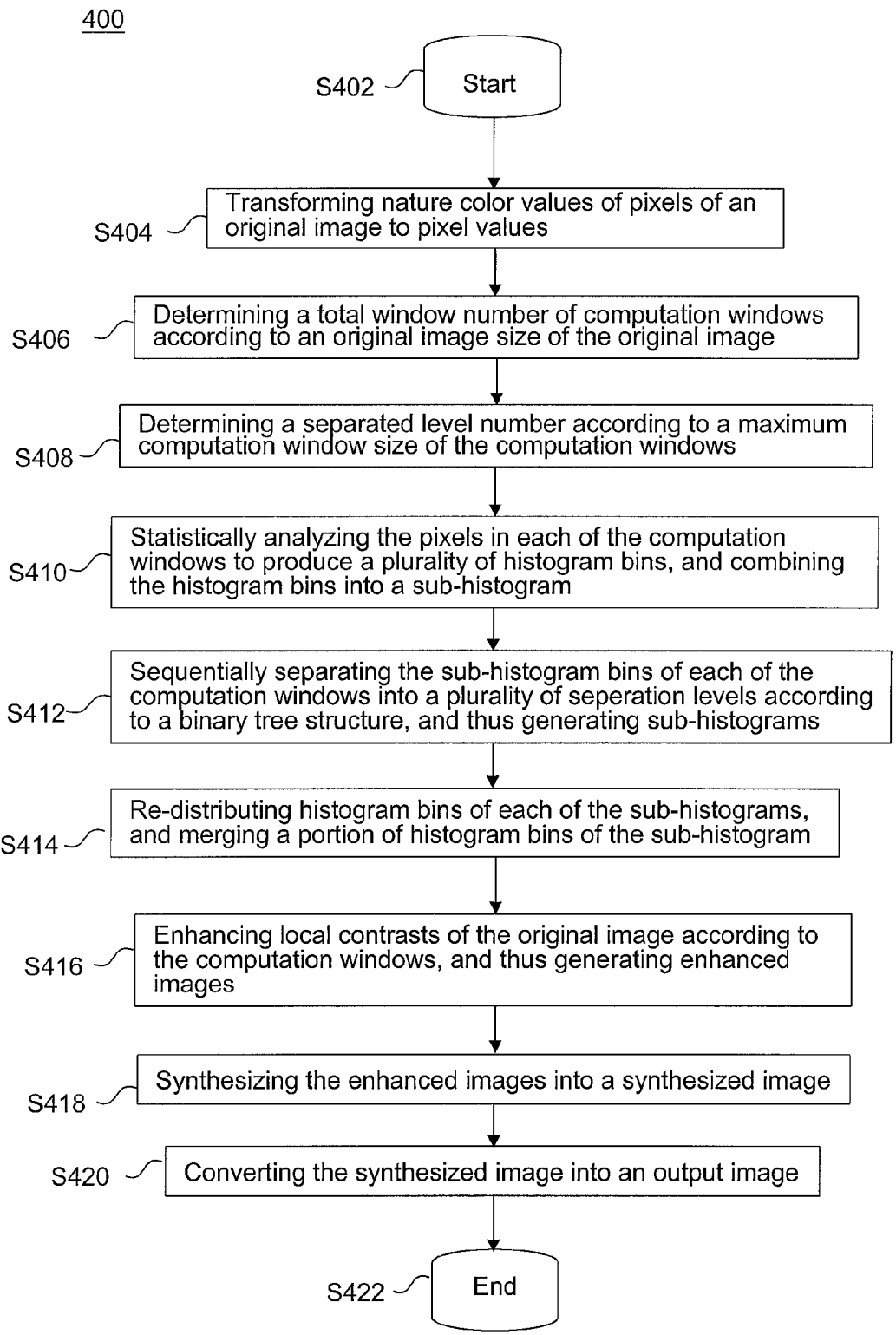
FIG. 4 is a flow chart showing an image contrast enhancing method according to an exemplary embodiment of the present disclosure.

According to exemplary embodiments of the present disclosure, an image contrast enhancement apparatus and a method thereof are provided. The image contrast enhancement apparatus and the method thereof are based on the concept of the adaptive histogram adjustment, and recursively execute the histogram separating method and the histogram adjusting method. Furthermore, the image contrast enhancement apparatus and the method thereof enhance the local contrasts of the image and analyze the image to flexibly utilize the large and small blocks, such that the features and contrasts of local images are automatically enhanced. In addition, the contrasts of the image are commonly enhanced by using the pixels of the neighboring area, and the drawback that the levels of the entire image are consistently enhanced is avoided. At the same time, the block effect is prevented, such that the texture area in the image is reserved, and the image is made smooth. In the following description, FIG. 1, FIG. 2, and FIG. 3 are used to introduce the image contrast enhancement apparatus, and FIG. 4 is used to introduce the image contrast enhancing method.

FIG. 1 is a system block diagram showing an image contrast enhancement apparatus provided by an exemplary embodiment of the present disclosure. Referring to FIG. 1, in this exemplary embodiment, an image contrast enhancement apparatus 100 includes a color space transformation module 112, a window determination module 114, a level division determination module 116, an image analysis module 120, a local contrast enhancement module 130, a contrast synthesis module 140, an inversed color space transformation module 150, and a memory module 160. The image contrast enhancement apparatus 100 receives an original image via the color space transformation module 112, and after a properly process for enhancing the contrast of the image is performed, the image contrast enhancement apparatus 100 outputs a synthesized image via the inversed color space transformation module 150.

Still referring to FIG. 1, in this exemplary embodiment, the color space transformation module 112 is used to perform a color space transformation on multiple nature color values of multiple pixels in the original image, and thus the transformed pixel values of the pixels are mapping to optimized pixel values. For example, the nature color values (such as the red, the green, and the blue in the RGB system) of the original image are transformed to the hue, the saturation, and the intensity in the HUV system. Thus, the transformed pixel values at least have a hue characteristic value, a saturation characteristic value, and an intensity characteristic value. However, the present disclosure is not limited thereto, the nature color values of the pixels in the original image may be further transformed to the other characteristic values of the NTSC, YCbCr, HIS, and CMY&CMYK systems known by people skilled in the art.

Still referring to FIG. 1, the window determination module 114 is configured to determine a total window number M of a plurality of computation windows according to the image size of the original image, wherein M is a positive integer. In the exemplary embodiment, for example, 6 of computation windows having different window sizes are selected, and the window sizes are respectively 100 pixels×100 pixels, 200 pixels×200 pixels, 300 pixels×300 pixels, 400 pixels×400 pixels, 500 pixels×500 pixels, and 600 pixels×600 pixels. Thus, in the exemplary embodiment, the total window number M is 6. However, the present disclosure is not limited thereto. In the other exemplary embodiments of the present disclosure, when the image size of the original image is smaller, the window size of each of the computation windows is decreased properly, such that the less computation windows are selected, and that is, the total window number M may be less than 6, and the minimum window size of the computation window may be less than 100 pixels×100 pixels. In addition, the computation window can be selected a rectangular window whose width and lengths thereof are different from each other, for example, 50 pixels×100 pixels. In the other exemplary embodiments of the present disclosure, when the image size of the original image is larger, the window size of each of the computation windows is increased properly, such that the more computation windows are selected, and that is, the total window number M may be more than 6, and the minimum window size of the computation window may be greater than 100 pixels×100 pixels.

Still referring to FIG. 1, the level division determination module 116 is designed for determining the necessary reserved resolution of texture after the color of the image is enhanced, so the level division determination module 116 is configured to determine the level number L (or called as separation level number L) in which histogram bins of each of the computation windows are iteratively separated. In the exemplary embodiment of the present disclosure, since the statistically analyzed total base numbers of the histogram bins of the computation window are the same, and in order to reduce the computation complexity, the separation level number L is determined to be 3 herein.

Still referring to FIG. 1, the image analysis module 120 statistically analyzes the pixels of each of the M computation windows to generate a plurality of histogram bins, and groups the histogram bins into a sub-histogram, wherein each of the histogram bins represents a total pixel number corresponding to a pixel value. The statistical analysis of the image analysis module 120 is to calculate a mean and a variance of multiple intensity characteristic values of the neighboring pixels corresponding to each pixel in each window, to record the mean and the variance corresponding to each pixel in a statistical pixel table (not shown in the drawings), wherein the neighboring pixels are included in a statistic window. In addition, the image analysis module 120 determines a window size of the statistic window according to the minimum window size of the computation windows and the separation level number L. In the exemplary embodiment, when the minimum window size is 100 pixels×100 pixels, and separation level number L is 3, the window size of the statistic window is 21 pixels×21 pixels correspondingly.

The local contrast enhancement module 130 is configured to enhance at least a local contrast of each of the M computation windows, and thus generate M enhanced image. The present disclosure can be further applied to the original image having multiple weak contrast areas, and after the image contrast enhancement apparatus 100 processing this original image, the weak contrast areas are automatically enhanced and improved without manually selecting the areas to enhance the contrasts of the selected areas. The local contrast enhancement module 130 includes a histogram separation unit 132, a histogram adjustment unit 134, and a local contrast enhancement unit 136. The histogram separation unit 132 sequentially separates the sub-histogram bins in each of the computation windows into L separation levels according to a tree structure, wherein L is the separation level number and a positive integer. When the separation process mentioned above is completed, the $i^{th}$ separation level has $2^i$ sub-histograms. In addition, from the first separation level to the $(L-1)^{th}$ separation level, the histogram separation unit 132 separates each sub-histogram in each separation level into two sub-histograms in the next separation level.

To put it more clearly, the histogram separation unit 132 separates each sub-histogram in each separation level into two sub-histograms in the next separation level, and the two sub-histograms correspond to the same separating point. The separating point is determined according to an equation (1), and the equation (1) is expressed as, $$\tau = \underset{0 \leq t < s}{\operatorname{argmin}} \left| Y - \frac{1}{m} \sum_{i=0}^{t} H(i) \right|, \quad \text{equation (1)}$$

wherein τ is the separating point, s is the dimension of the histogram bins, t is the index of the histogram bin, and argmin (j) is a function for selecting the index corresponding to the minimum of the variable j, and Y is the configuration parameter of the separating point, Y is a real number greater than 0 and less than 1, m is total pixel number of the pixels in each computation window, and H(k) is a total pixel number of the $k^{th}$ histogram bin. For example, referring to FIG. 2A, FIG. 2A is a schematic diagram demonstrating that the image contrast enhancement apparatus 100 separates a sub-histogram. In the exemplary embodiment, the configuration parameter Y of the separating point is set as 0.5, and the histogram separation unit 132 separates the sub-histogram 210 in the current separation level to the sub-histograms 220 and 230 in the next separation level. The sub-histograms 210, 220, and 230 are represented by the histogram diagram, the y-axis of each of the sub-histograms 210, 220, and 230 represents the pixel number (or a number of pixels corresponding to a pixel value), and the x-axis of each of the sub-histograms 210, 220, and 230 represents the histogram bin index. In addition, still referring to FIG. 2A, the separating point τ of the sub-histograms 220 and 230 is 50. However, the present disclosure is not limited thereto, the configuration parameter Y of the separating point is a real number between 0 and 1, and the separating point τ varies according to the distribution of the intensity characteristic values and the configuration parameter Y of the separating point.

Figure 2B:
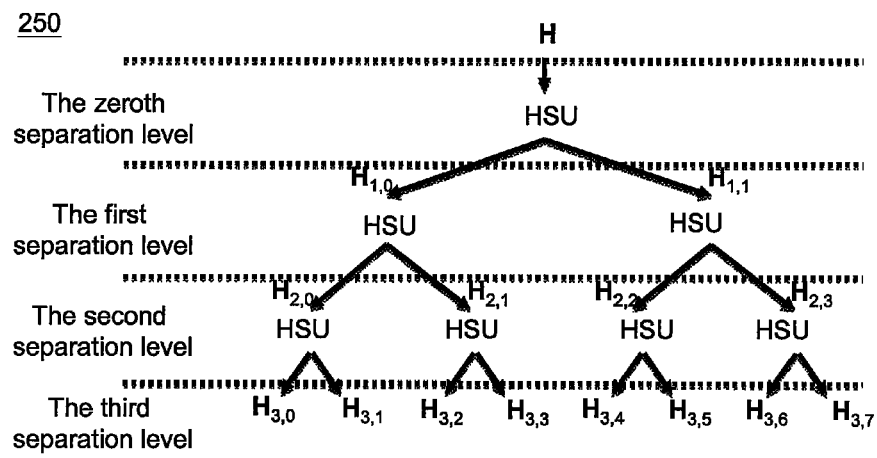
FIG. 2B is a logically schematic diagram demonstrating that the image contrast enhancement apparatus sequentially separates a sub-histogram to a plurality of separation levels.

FIG. 2B is a logically schematic diagram demonstrating that the image contrast enhancement apparatus 100 sequentially separates a sub-histogram into a plurality of separation levels. In other words, FIG. 2B is the condition in which the histogram bins of each of the computation window are sequentially separated into L separation levels according to the tree structure. Still referring to FIG. 2B, in the exemplary embodiment, the separation level number L is set to be 3, and after the separation process mentioned above is completed, as shown in FIG. 2B, the zeroth separation level has $2^0$ sub-histogram which is the input histogram diagram formed by the histogram bins, and the histogram bins are generated by the image analysis module 120 via initially statistically analyzing the pixel values of each computation window. In other words, the input histogram diagram is the sub-histogram H in the zeroth separation level. Next, the histogram separation unit 132 separates the sub-histogram H in the zeroth separation level into the sub-histograms $H_{1,0}$, $H_{1,1}$ in the first separation level. Now, as shown in FIG. 2B, the first separation level has $2^1$ sub-histograms. Then, the histogram separation unit 132 respectively separates the sub-histograms $H_{1,0}$, $H_{1,1}$ in the first separation level into the each pair of two sub-histograms $H_{2,0}$, $H_{2,1}$, $H_{2,2}$, $H_{2,3}$ in the second separation level. Now, the second separation level has $2^2$ sub-histograms. Finally, according to the similar separation manner above, the histogram separation unit 132 respectively separates the sub-histograms $H_{2,0}$, $H_{2,1}$, $H_{2,2}$, $H_{2,3}$ into the each pair of two sub-histograms $H_{3,0}$, $H_{3,1}$, $H_{3,2}$, $H_{3,3}$, $H_{3,4}$, $H_{3,5}$, $H_{3,6}$, $H_{3,7}$ in the third separation level. Now, the third separation level has $2^3$ sub-histograms. However, the present disclosure is not limited thereto. In the other exemplary embodiment of the present disclosure, the histogram bins in each computation window is sequentially separation into L separation levels, and L can be less than 3 or greater than 3.

In addition, the histogram separation unit 132 may increase or decrease the base width of each sub-histogram and the other base width of other sub-histogram corresponding to the same separating point according to the equations (2) and (3), such that the group densities of the two sub-histograms are the same, wherein the density ratio of the group density is determined in response to the Y value of equation (1). Equations (2) and (3) are expressed as, $$t_0 + t_1 = s, \quad \text{equation (2)}$$

$$\frac{m_0}{t_0} = \frac{m_1}{t_1}, \quad \text{equation (3)}$$

wherein $t_0$ is the base width of the sub-histogram, $t_1$ is the other base width of the other sub-histogram corresponding to the same separating point, $m_0$ is a total pixel number of the sub-histogram, $m_1$ is a total pixel number of the other sub-histogram, and the fractional number $m_q/t_q$ is a group density of the $q^{th}$ sub-histogram. For example, referring to FIG. 2A, the base width of the sub-histogram 210 is 255, the base width of the sub-histogram 230 separated from the sub-histogram 210 is 205, and the base width of the sub-histogram 220 separated from the sub-histogram 210 is 50. The sub-histograms 220 and 230 correspond to the same separating point, i.e. the histogram bin index of 50. After the histogram separation unit 132 increases or decreases the base width of each sub-histogram, the sub-histograms 220 and 230 corresponding to the same separating point substantially have the same group density.

Still referring to FIG. 1, the histogram adjustment unit 134 re-distributes the histogram bins of each sub-histogram in each computation window, or merges a portion of histogram bins of each sub-histogram. To put it concretely, after the histogram adjustment unit 134 increases or decreases the base width of the sub-histogram and the other width of the other sub-histogram corresponding to the same separating point in the separation level, if the total number of the histogram bins having the non-zero pixel values in the sub-histogram is less than the dimension of the sub-histogram, the histogram adjustment unit 134 increases the base width of the sub-histogram and re-distributes the base width. On the contrary, after the histogram adjustment unit 134 increases or decreases the base width of the sub-histogram and the other width of the other sub-histogram corresponding to the same separating point in the separation level, if the total number of the histogram bins having the non-zero pixel values in the sub-histogram is greater than the dimension of the sub-histogram, the histogram adjustment unit 134 merges a portion of the histogram bins of the sub-histogram such that the base width of the sub-histogram is decreased.

Taking FIG. 3 as an example to describe the histogram adjustment unit 134 clearly, FIG. 3 is a schematic diagram demonstrating that the histogram bins are re-distributed and merged according to an exemplary embodiment of the present disclosure. Referring to FIG. 3, the total number of the histogram bins having the non-zero pixel values in the sub-histogram 310 (i.e. the sub-histogram 310 is the sub-histogram $G_{Lj}$ after the histogram separation unit 132 increases or decreases the base width thereof, wherein L is the separation level number, and $G_{Lj}$ is the $j^{th}$ sub-histogram in the $L^{th}$ separation level) is assumed to be 4, and the dimension of the sub-histogram 310 is assumed to be 7. Thus, the histogram adjustment unit 134 inserts the zero histogram bins in the sub-histogram 310. After the re-distributing process is performed, the sub-histogram 310 is converted into the sub-histogram 320 (i.e. the adjusted sub-histogram $\hat{H}_{Lj}$). In the other exemplary embodiment of FIG. 3, the total number of the histogram bins having the non-zero pixel values in the sub-histogram 310 is assumed to be 4, and the dimension of the sub-histogram 310 is assumed to be 3. Thus, the histogram adjustment unit 134 merges a portion of sub-histogram bins of the sub-histogram 310, and after the merging process is performed, the sub-histogram 310 is converted into the sub-histogram 330 (i.e. the adjusted sub-histogram $\hat{H}_{Lj}$).

In the exemplary embodiment, the histogram separation unit 132 and the histogram adjustment unit 134 of the image contrast enhancement apparatus 100 recursively perform the following actions. The histogram separation unit 132 separates each sub-histogram in each computation window to two sub-histograms in the next separation level, and increases or decreases the base width of the sub-histogram and the other base width of the other sub-histogram corresponding to the same separating point, such that two sub-histograms substantially have the same group density; and for the two sub-histograms having the same group density and corresponding to the same separating point, the histogram adjustment unit 134 re-distributes the histogram bins of one of the two sub-histograms, or merges a portion of the histogram bins of the other one of the two sub-histograms, such that the two sub-histograms corresponding to the same separating point substantially have the same group density. In the exemplary embodiment of FIG. 2A, since the base width of the original sub-histogram 210 is 256, the respective base widths of the separation sub-histograms 220 and 230 should be adjusted to be 128 (i.e., 256/2=128). Accordingly, the base width of the separation sub-histogram 220 is decreased to 128 from 206, and the base width of the separation sub-histogram 230 is increased to 128 from 50.

The local contrast enhancement unit 136 records the pixel values of the sub-histograms in each separation level of each computation window into a sub-histogram mapping table (not shown in the drawings), and averages the pixel values of the sub-histograms to generate a plurality of enhanced images, wherein the each of the enhanced images corresponds to one of the computation windows mentioned above. For example, in the exemplary embodiment, the image contrast enhancement apparatus 100 chooses 6 of computation windows to enhance the local contrasts of the image, and the local contrast enhancement unit 136 therefore generates 6 of enhanced images. At the same time, the base width and the group density of each sub-histogram and the base width and the group density of the other sub-histogram corresponding to the same separating point are substantially the same, such that the computation for averaging the pixel values can be processed efficiently. In other word, the efficiency of the computation for averaging the pixel values after the base width and group density are adjusted is better than that before the base width and group density are adjusted. The method for averaging the pixel values can be a union computation or an intersection computation performed on those pixel values. The method for averaging the pixel values is known by people skilled in the art, and is not stated concretely herein. The memory module 160 is configured to record the pixel value statistics table, the sub-histogram table, the total window number of the computation windows, the separation level number L, and the configuration parameter Y of the separating point.

The contrast synthesis module 140 of the image contrast enhancement apparatus 100 is configured to synthesize the enhanced images into a synthesized image. To put it concretely, the contrast synthesis module 140 is configured to find the mean and the variance of each pixel in the pixel value statistics table, so as to determine a weighting value of each of the enhanced images, and generate the synthesized image by performing a weighting summation of the enhanced images according to the weighting values. Now, the synthesized image is simultaneously converted to the image whose colors and contrast distribution are acceptable to human eyes. The method for determining the weighting value and the weighting summation of the enhanced images are known by people skilled in the art, and thus are not described again herein. In addition, the inversed color space transformation module 150 of the image contrast enhancement apparatus 100 is configured to convert the synthesized image to an output image, wherein the color system of the output image now is the nature color system of the original image. After introducing the main elements and the operation of the image contrast enhancement apparatus 100, FIG. 4 is used to describe an image contrast enhancing method.

FIG. 4 is a flow chart showing an image contrast enhancing method 400 for enhancing the contrast of the image according to an exemplary embodiment of the present disclosure. Both referring to FIG. 1 and FIG. 4, in the exemplary embodiment, the image contrast enhancing method 400 begins from step S402, and then step S404 is executed. In the step S404, a color space transformation is performed on the nature color values of pixels of the image, such that pixel values of pixel are mapping to the optimized pixel values. After the step S404 is executed, step S406 is then executed. In the step S406, the total window number of computation windows is determined according to an original image size of the original image. After the step S406 is executed, step S408 is then executed. In the step S408, the separation level number is determined according to a maximum window size of the computation windows. After the step S408 is executed, step S410 is then executed. In the step S410, the pixel values of the pixels in each computation window are statistically analyzed to generate multiple histogram bins, and the histogram bins are combined into a sub-histogram. After the step S410 is executed, step S412 is then executed. In the step S412, the histogram bins of each computation window are sequentially separated into the multiple separation levels by a tree structure, and thus generating multiple sub-histograms. After the step S412 is executed, step S414 is then executed.

Still referring to FIG. 4, in the step S414, the histogram bins in each of the sub-histograms are re-distributed, or a portion of the histogram bins in each of the sub-histograms are merged. After the step S414 is executed, step S416 is then executed. In the step S416, the local contrasts of the original image are enhanced according to the computation windows, and thus generating multiple enhanced images, wherein each of the enhanced images corresponds to one of the computation windows. After the step S416 is executed, step S418 is then executed. In the step S418, the enhanced images are synthesized into a synthesized image, and the synthesized image is simultaneously converted to an image whose colors and contrast distribution are acceptable by human eyes. After the step S418 is executed, step S420 is then executed. In step S420, the synthesized image is converted into an output image, wherein the color system of the output image is the nature color system of the original image. After the step S420 is executed, step S422 is then executed. The image contrast enhancing method 400 ends in the step S422. It is noted that, steps S404 and S420 may be executed simultaneously, and the execution order of steps in the image contrast enhancing method 400 may be properly re-arranged according to the condition of the real application.

To sum up, the exemplary embodiments of the present disclosure provide an image contrast enhancement apparatus and a method thereof. The image contrast enhancement apparatus and the method thereof are based on the concept of the adaptive histogram adjustment, and recursively execute the histogram separating method and the histogram adjusting method. Furthermore, the image contrast enhancement apparatus and the method thereof enhance the local contrasts of the image and analyze the image to flexibly utilize the large and small blocks, such that the features and contrast of the local image are automatically enhanced. In addition, the contrast of the image is commonly enhanced by using the pixels of the neighboring area, and the drawback that the levels of the entire image are consistently enhanced is avoided. At the same time, the block effect is prevented, such that the texture area in the image is reserved, and the image is made smooth.

It will be apparent to those skilled in the art that various modifications and variations of the exemplary embodiments can be made to the structure of the present disclosure without departing from the scope or spirit of the present disclosure. In view of the foregoing descriptions, it is intended that the present disclosure covers modifications and variations of the exemplary embodiments if they fall within the scope of the following claims and their equivalents.

What is claimed is:

1. An image contrast enhancement apparatus, used to process an original image, the image contrast enhancement apparatus comprising:
    a processor and a memory;
    an image analysis module, statistically analyzing pixels of each of M computation windows to produce a plurality of histogram bins, and combining the histogram bins corresponding to each computation window into a sub-histogram, wherein M is a positive integer greater than one, sizes of the computation windows are not identical, and each of the histogram bins presents a total pixel number corresponding to a pixel value; and
    a local contrast enhancement module, enhancing at least a local contrast for each of the computation windows, and generating M enhanced images, wherein the local contrast enhancement module comprises:
        a histogram separation unit, sequentially separating the histogram bins in each of the computation windows into L separation levels according to a tree structure, separating the sub-histogram in each separation level into two sub-histograms in the next separation level, and increasing or decreasing a base width of each sub-histogram, such that group densities of the two sub-histograms are identical, wherein L is a positive integer greater than one and a separation level number;
        a histogram adjustment unit, re-distributing the histogram bins in each sub-histogram, or merging a portion of histogram bins in each sub-histogram; and
        a local contrast enhancement unit, enhancing the at least one local contrast of the original image according to the sub-histogram of the computation windows, and generating the enhanced images.

2. The image contrast enhancement apparatus according to claim 1, the image contrast enhancement apparatus further comprising:
    a color space transformation module, performing a color space transformation on a plurality of nature color values of pixels of the original image, such that pixel values of the pixels are mapping to optimized pixel values;
    a window determination module, determining a total window number of the computation windows according to an original image size of the original image;
    a level division determination module, determining the separation level number according to a total base number of the histogram bins of the sub-histograms in the computation window;
    a contrast synthesis module, synthesizing the enhanced images into a synthesized image; and
    an inversed color space transformation module, converting the synthesized image into an output image.

3. The image contrast enhancement apparatus according to claim 2, wherein the pixel values at least have a hue characteristic value, a saturation characteristic value, and an intensity characteristic value.

4. The image contrast enhancement apparatus according to claim 3, wherein the statistical analysis performed by the image analysis module comprises steps of:
    for each pixel in each computation window, obtaining a mean and a variance of intensity characteristic values of neighboring pixels;
    recording the mean and the variance corresponding to each pixel in a pixel value statistics table, wherein the neighboring pixels are comprised in a statistic window; and
    determining, at the image analysis module, a statistic window size of the statistic window according to a minimum computation window size of the computation window and the separation level number.

5. The image contrast enhancement apparatus according to claim 4, wherein the local contrast enhancement unit records the pixel values of the sub-histograms in each separation level of each computation window in a sub-histogram mapping table, and averages the pixel values of the sub-histograms to generate the enhanced images.

6. The image contrast enhancement apparatus according to claim 5, wherein the contrast synthesis module determines a weighting value of each enhanced image according to the mean and the variance of each pixel in the pixel value statistics table, and performs a weighting summation on the enhanced images according to the weighting values, such that the synthesized image is generated.

7. The image contrast enhancement apparatus according to claim 1, wherein the histogram separation unit separates each sub-histogram in each separation level into the two sub-histograms in the next separation level, and the two sub-histograms correspond to a same separating point, the separating point is determined by calculating an equation (1), and the equation (1) is expressed as, $$\tau = \operatorname*{argmin}_{0 \leq t < s} \left| Y - \frac{1}{m} \sum_{i=0}^{t} H(i) \right|, \quad \text{equation (1)}$$

wherein $\tau$ is the separating point, s is a dimension of the histogram bins, t is the index of the histogram bins, and argmin(j) is a function for selecting the index corresponding to the minimum of the variable j, and Y is the configuration parameter of the separating point, Y is a real number greater than 0 and less than 1, m is a total pixel number of the pixels in each computation window, and H(k) is a total pixel number of the $k^{th}$ histogram bin.

8. The image contrast enhancement apparatus according to claim 7, wherein the histogram separation unit increases or decreases the respective base widths of the two sub-histograms corresponding to the same separating point in each separation level according to equations (2) and (3), such that the group densities of the two sub-histograms are the same, wherein a density ratio of the group density is determined in response to the Y value of the equation (1), and the equations (2) and (3) are expressed as, $$t_0 + t_1 = s \quad \text{equation (2)}$$

$$\frac{m_0}{t_0} = \frac{m_1}{t_1}, \quad \text{equation (3)}$$

wherein $t_0$ is the base width of the sub-histogram, $t_1$ is the other base width of the other sub-histogram corresponding to the same separating point, $m_0$ is a total pixel number of the sub-histogram, $m_1$ is a total pixel number of the other sub-histogram corresponding to the same separating point, and the fractional number $m_q/t_q$ is a group density of the $(q^{th}$ sub-histogram.

9. The image contrast enhancement apparatus according to claim 7, wherein the histogram separation unit and the histogram adjustment unit recursively perform the following steps:
separating, at the histogram separation unit, each sub-histogram in each computation window into two sub-histograms in the next separation level, and increasing or decreasing the base width of the sub-histogram and the other base width of the other sub-histogram corresponding to the same separating point, such that two sub-histograms substantially have the same group density; and
for the two sub-histograms having the same group density and corresponding to the same separating point, re-distributing the histogram bins of one of the two sub-histograms, or merging a portion of the histogram bins of the other one of the two sub-histograms by the histogram adjustment unit, such that the two sub-histograms corresponding to the same separating point substantially have the same group density.

10. The image contrast enhancement apparatus according to claim 8, after the histogram adjustment unit increases or decreases the respective base width of the two sub-histograms corresponding to the same separation point,
if the total number of the histogram bins having the non-zero pixel values in the sub-histogram is less than the dimension of the sub-histogram, the histogram adjustment unit increases the base width of the sub-histogram and re-distributes the base width; and
if the total number of the histogram bins having the non-zero pixel values in the sub-histogram is greater than the dimension of the sub-histogram, the histogram adjustment unit merges a portion of the histogram bins of the sub-histogram such that the base width of the sub-histogram is decreased.

11. An image contrast enhancing method, used to process an original image, comprising:
statistically analyzing pixels of each of M computation windows to produce a plurality of histogram bins, and combining the histogram bins corresponding to each computation window into a sub-histogram, wherein M is a positive integer greater than one, sizes of the computation windows are not identical, and each of the histogram bins represents a total pixel number corresponding to a pixel value;
sequentially separating the histogram bins in each of the computation windows into L separation levels according to a tree structure, wherein L is a positive integer greater than one and a separation level number;
separating the sub-histogram in each separation level into two sub-histograms in the next separation level, and increasing or decreasing a base width of each sub-histogram, such that group densities of the two sub-histograms are identical
re-distributing the histogram bins in each sub-histogram, or merging a portion of histogram bins in each sub-histogram; and
enhancing the at least one local contrast of the original image according to the sub-histogram of the computation windows, and thus generating enhanced images.

12. The image contrast enhancing method according to claim 11, further comprising:
performing a color space transformation on a plurality of nature color values of pixels of the original image, such that pixel values of the pixels are mapping to optimized pixel values;
determining a total window number of the computation windows according to an original image size of the original image;
determining the separation level number according to a total base number of the histogram bins of the sub-histograms of the computation window;
synthesizing the enhanced images into a synthesized image; and
converting the synthesized image into an output image.

13. The image contrast enhancing method according to claim 12, wherein the pixel values at least have a hue characteristic value, a saturation characteristic value, and an intensity characteristic value.

14. The image contrast enhancing method according to claim 13, wherein the statistical analysis comprises steps of:

for each pixel in each computation window, obtaining a mean and a variance of intensity characteristic values of neighboring pixels;

recording the mean and the variance corresponding to each pixel in a pixel value statistics table, wherein the neighboring pixels are comprised in a statistic window; and determining a statistic window size of the statistic window according to a minimum computation window size of the computation window and the separation level number.

15. The image contrast enhancing method according to claim 14, wherein step of enhancing the at least one local contrast of the original image according to the computation windows comprises:

recording the pixel values of the sub-histograms in each separation level of each computation window in a sub-histogram mapping table; and averaging the pixel values of the sub-histograms to generate the enhanced images.

16. The image contrast enhancing method according to claim 14, wherein step of synthesizing the enhanced images into a synthesized image comprises:

determining a weighting value of each enhanced image according to the mean and the variance of each pixel in the pixel value statistics table; and performing a weighting summation on the enhanced images according to the weighting values, such that the synthesized image is generated.

17. The image contrast enhancing method according to claim 11, wherein the each sub-histogram in each separation level is separation into the two sub-histograms in the next separation level, and the two sub-histograms correspond to a same separating point, the separating point is determined by calculating an equation (1), and the equation (1) is expressed as, $$\tau = \underset{0 \leq t < s}{\operatorname{argmin}} \left| Y - \frac{1}{m} \sum_{i=0}^{t} H(i) \right|, \quad \text{equation (1)}$$

wherein $\tau$ is the separating point, s is a dimension of the histogram bins, t is the index of the histogram bins, and argmin(j) is a function for selecting the index corresponding to the minimum of the variable j, and Y is the configuration parameter of the separating point, Y is a real number greater than 0 and less than 1, m is total pixel number of the pixels in each computation window, and H(k) is a total pixel number of the $k^{th}$ histogram bin.

18. The image contrast enhancing method according to claim 17, wherein the respective base widths of the two sub-histograms is increased or decreased corresponding to the same separating point in each separation level according to equations (2) and (3), such that the group densities of the two sub-histograms are the same, wherein the density ratio of the group density is determined in response to the Y value of the equation (1), and the equations (2) and (3) are expressed as, $$t_0 + t_1 = s \quad \text{equation (2)}$$

$$\frac{m_0}{t_0} = \frac{m_1}{t_1}, \quad \text{equation (3)}$$

wherein $t_0$ is the base width of the sub-histogram, $t_1$ is the other base width of the other sub-histogram corresponding to the same separating point, $m_0$ is a total pixel number of the sub-histogram, $m_1$ is a total pixel number of the other sub-histogram corresponding to the same separating point, and the fractional number $m_q/t_q$ is a group density of the $q^{th}$ sub-histogram.

19. The image contrast enhancing method according to claim 17, further comprising recursively executing the following step of:

separating each sub-histogram in each computation window into two sub-histograms in the next separation level, and increasing or decreasing the base width of the sub-histogram and the other base width of the other sub-histogram corresponding to the same separating point, such that two sub-histograms substantially have the same group density; and for the two sub-histograms having the same group density and corresponding to the same separating point, re-distributing the histogram bins of one of the two sub-histograms, or merging a portion of the histogram bins of the other one of the two sub-histograms, such that the two sub-histograms corresponding to the same separating point substantially have the same group density.

20. The image contrast enhancing method according to claim 18, after increasing or decreasing the respective base widths of the two sub-histograms corresponding to the same separating point in the separation level, if the total number of the histogram bins having the non-zero pixel values in the sub-histogram is less than the dimension of the sub-histogram, increasing the base width of the sub-histogram and re-distributing the base width; and if the total number of the histogram bins having the non-zero pixel values in the sub-histogram is greater than the dimension of the sub-histogram, merging a portion of the histogram bins of the sub-histogram such that the base width of the sub-histogram is decreased.

\* \* \* \* \*